United States Patent
Miyake

[11] Patent Number: 6,111,822
[45] Date of Patent: Aug. 29, 2000

[54] MAGNETIC HEAD WITH LARGE CROSS-SECTIONAL AREA CORE FOR USE WITH MAGNETICALLY INDUCED SUPER RESOLUTION MEDIUM AND MAGNETO OPTICAL RECORDING APPARATUS

[75] Inventor: Tomoyuki Miyake, Nara, Japan

[73] Assignee: Sharp Kabushiki Kaisha, Osaka, Japan

[21] Appl. No.: 09/096,042

[22] Filed: Jun. 11, 1998

[30] Foreign Application Priority Data

Jun. 12, 1997 [JP] Japan ..................... 9-155185

[51] Int. Cl.[7] ................................. G11B 11/00
[52] U.S. Cl. .......................... 369/13; 360/114
[58] Field of Search .................. 369/13, 14; 360/66, 360/119, 59, 114, 103, 125, 60, 104; 365/122

[56] References Cited

U.S. PATENT DOCUMENTS

| | | | |
|---|---|---|---|
| 5,107,471 | 4/1992 | Miyake et al. | 369/13 |
| 5,202,863 | 4/1993 | Miyatake et al. | 369/13 |
| 5,517,472 | 5/1996 | Miyatake et al. | 369/13 |

FOREIGN PATENT DOCUMENTS 63-2175548A   9/1988   Japan .

*Primary Examiner*—Ali Neyzari
*Attorney, Agent, or Firm*—David G. Conlin; Peter J. Manus; Dike Bronstein Roberts & Cushman, LLP

[57] ABSTRACT

A magneto-optical recording apparatus for recording information in a magnetically induced super resolution medium (e.g., magneto-optical disk) comprising a magnetic head having a magnetic core whose sectional area along a plane parallel to a surface of the magnetically induced super resolution medium is larger than 0.08 mm$^2$, a heating section for heating the recording layer of the magnetically induced super resolution medium, and a recording section for recording the information in the recording layer of the magnetically induced super resolution medium by driving the magnetic head and heating the recording layer using the heating section. Consequently, both the sensitivity to the recording magnetic field and reproductivity of high-density bits of the magnetically induced super resolution medium can be improved.

5 Claims, 4 Drawing Sheets

MAGNETIC HEAD WITH LARGE CROSS-SECTIONAL AREA CORE FOR USE WITH MAGNETICALLY INDUCED SUPER RESOLUTION MEDIUM AND MAGNETO OPTICAL RECORDING APPARATUS

FIELD OF THE INVENTION

The present invention relates to (1) a magnetic head effectively used for a magnetically induced super resolution (MSR) medium, (2) a magneto-optical recording apparatus using the above magnetic head, and (3) a method of using the above magnetic head.

BACKGROUND OF THE INVENTION

Technologies in the field of optical disks have been advancing to increase a capacity and density of the same, because most of the information handled by today's personal computers, such as digital moving pictures, demands a large capacity and a high transfer rate. These advances have made optical disks having a several-fold capacity of CD-ROMs (Compact Disk Read Only Memories) almost practically available.

In case of a read only optical disk in which information is recorded in the form of pits, a capacity and density have been increased using techniques of reducing a laser wavelength, a thickness of the disk substrate, etc.

Track density of a conventional optical disk has been selected in such a manner that a resulting track pitch will not be affected by crosstalk. The track density and track pitch are determined by a spot of a laser beam irradiated to the optical disk, and therefore, depends on a wavelength of the laser beam. Likewise, the shortest pit length depends on a diameter of a spot of the laser beam, namely, the wavelength of the laser beam.

Since the recording density in the optical recording depends on a diameter of a spot of irradiated light, techniques to further increase the density have been developed mainly by improving the performance of the optical recording medium or using super resolution technique.

Under these circumstances, an MSR technique for a magneto-optical recording medium and the super resolution technique for read only optical disks have been developed recently as a technique to reduce reproducible data length. The former makes it possible to reproduce information from a magneto-optical recording medium with a higher density by reducing the leakage from the neighboring bits using the fact that a magnetic coupling interaction between the layers of the magneto-optical recording medium varies with temperatures. Whereas the latter makes it possible to reproduce information from a magneto-optical recording medium having a higher density than a conventional technique by using a polymer film, which is opaque at room temperature but starts to transmit laser beams with increasing temperature when irradiated by the same, as a reflection film of the recording pit of the read only disk.

Here, the MSR technique is a technique, with which only the subject data to be read (recording bit) are taken out, so that the reading performance is improved by eliminating the interference of the neighboring data. In the MSR technique, the neighboring data are masked by the reproducing layer, and the masking principle underlies on the magnetic exchange interaction with the recording layer. This is the reason why the technique is so called.

Incidentally, edge recording by combining the above super resolution technique and magnetic field modulation recording is effective to increase density in the magneto-optical recording. However, the reproducing layer is inevitably added to the recording layer, and this film deteriorates the sensitivity of the recording layer to the recording magnetic field. Thus, it has been very difficult to improve the reproductivity of high-density bits while maintaining good sensitivity to the recording magnetic field. Moreover, poor sensitivity to the recording magnetic field causes a problem that the magnetic head consumes a considerable power when recording the information or the reproducing characteristics result unsatisfactorily.

SUMMARY OF THE INVENTION

It is therefore an object of the present invention to provide a magnetic head for a magnetically induced super resolution (MSR) medium which can improve both the sensitivity to the recording magnetic field and the reproductivity of high-density bits of the MSR medium, a magneto-optical recording apparatus using such a magnetic head, and a method of using such a magnetic head.

To fulfill the above and other objects, a magnetic head of the present invention for a magnetically induced super resolution (MSR) medium is characterized by having a magnetic core whose sectional area along a plane parallel to a surface of the MSR medium is larger than 0.08 mm$^2$.

Also, to fulfill the above and other objects, a magneto-optical recording apparatus of the present invention for recording information in a magnetically induced super resolution medium (MSR) having a recording layer and a reproducing layer is characterized by being furnished with:
  a magnetic head;
  an optical pick-up;
  a heating section for heating the recording layer of the MSR medium using the optical pick-up; and
  a recording section for recording the information in the recording layer of the MSR medium by driving the magnetic head and heating the recording layer using the heating section,
wherein the magnetic head has a magnetic core whose sectional area along a plane parallel to a surface of the MSR medium is larger than 0.08 mm$^2$.

Further, to fulfill the above and other objects, a method of using a magnetic head of the present invention for a magnetically induced super resolution (MSR) medium is characterized by recording information in the MSR medium using a magnetic head having a magnetic core whose sectional area along a plane parallel to a surface of the MSR medium is larger than 0.08 mm$^2$.

According to the above arrangements, the magnetic head's sectional area of the magnetic core along the plane parallel to the surface of the MSR medium is set larger than 0.08 mm$^2$. Thus, the sensitivity of the MSR medium to the recording magnetic field can be improved, and this effect is particularly obvious in the magnetic field modulation recording. Hence, the information can be overwritten on the MSR medium. Consequently, the magnetic field intensity necessary to record the information can be reduced, and the power consumption and heat generation of the magnetic head can be suppressed satisfactorily.

The recording section in the magneto-optical recording apparatus of the present invention preferably records the information by the magnetic field modulation method.

Also, the magneto-optical recording apparatus of the present invention is preferably arranged in such a manner to include reproducing means for reading recorded information from the MSR medium as the in-plane magnetization direction of the reproducing layer at room temperature changes to a perpendicular magnetization direction with an increase of the medium temperature caused by irradiation of laser beams during the reading action.

For a fuller understanding of the nature and advantages of the invention, reference should be made to the ensuing detailed description taken in conjunction with the accompanying drawings.

DESCRIPTION OF THE EMBODIMENTS

Embodiment 1

Referring to FIGS. 1 through 4, the following description will describe an example embodiment of the present invention.

Figure 1:
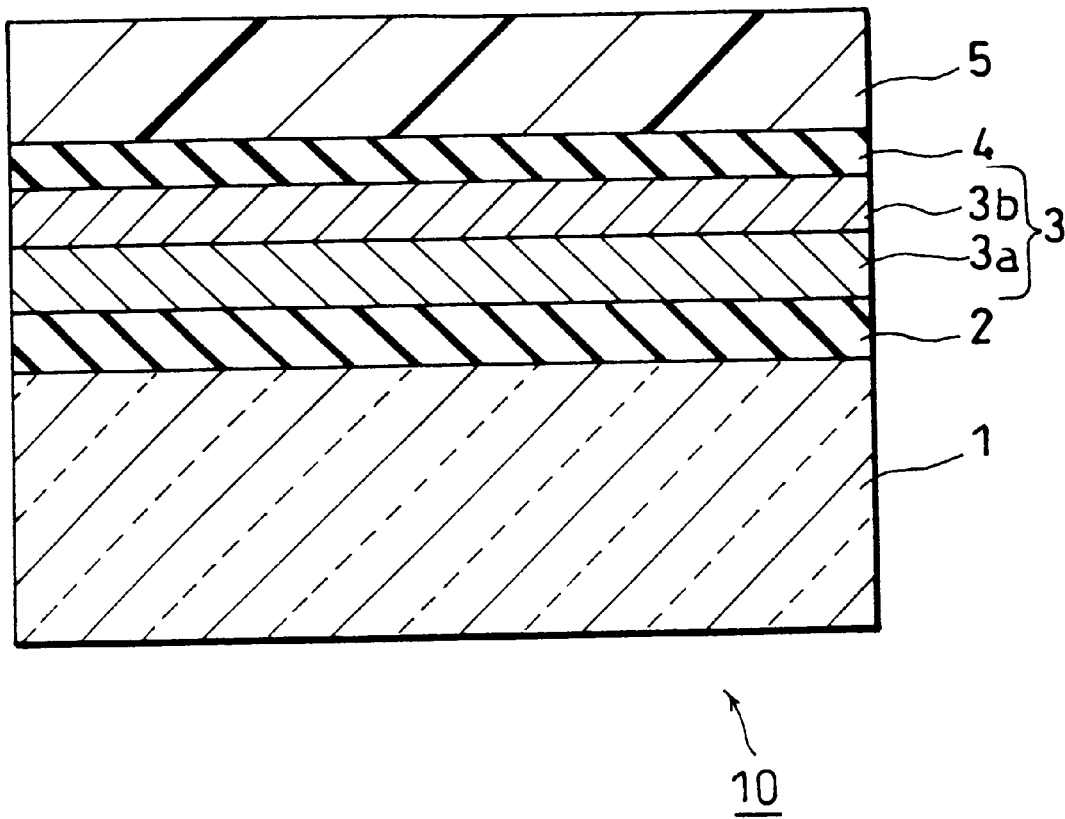
FIG. 1 is a cross section of a magneto-optical disk in accordance with an example embodiment of the present invention.

FIG. 1 illustrates a cross section of a magneto-optical disk 10 as an example MSR medium of the present embodiment. The magneto-optical disk 10 comprises a transparent substrate 1 made of polycarbonate, over which a 65 nm-thick dielectric layer 2 made of aluminum nitride (AlN), a 100 nm-thick super resolution recording/reproducing layer 3, a 20 nm-thick dielectric layer 4 made of aluminum nitride (AlN), and a 10 $\mu$m-thick protection layer 5 made of a high polymer film are layered sequentially in a vertical direction.

The super resolution recording/reproducing layer 3 is a double-layer film composed of a 50 nm-thick reproducing layer 3a made of GdFeCo and a 50 nm-thick recording layer 3b made of DyFeCo. The reproducing layer 3a has an in-plane magnetization direction (a direction parallel to the reproducing layer 3a) at room temperature and a perpendicular magnetization direction above 100° C., and its Curie temperature is in a range between 300–400° C. approximately. The recording layer 3b has a perpendicular magnetization direction, and its Curie temperature is in a range between 200–250° C. approximately. Each of the reproducing layer 3a and recording layer 3b may be composed of more than one layer.

Figure 2:
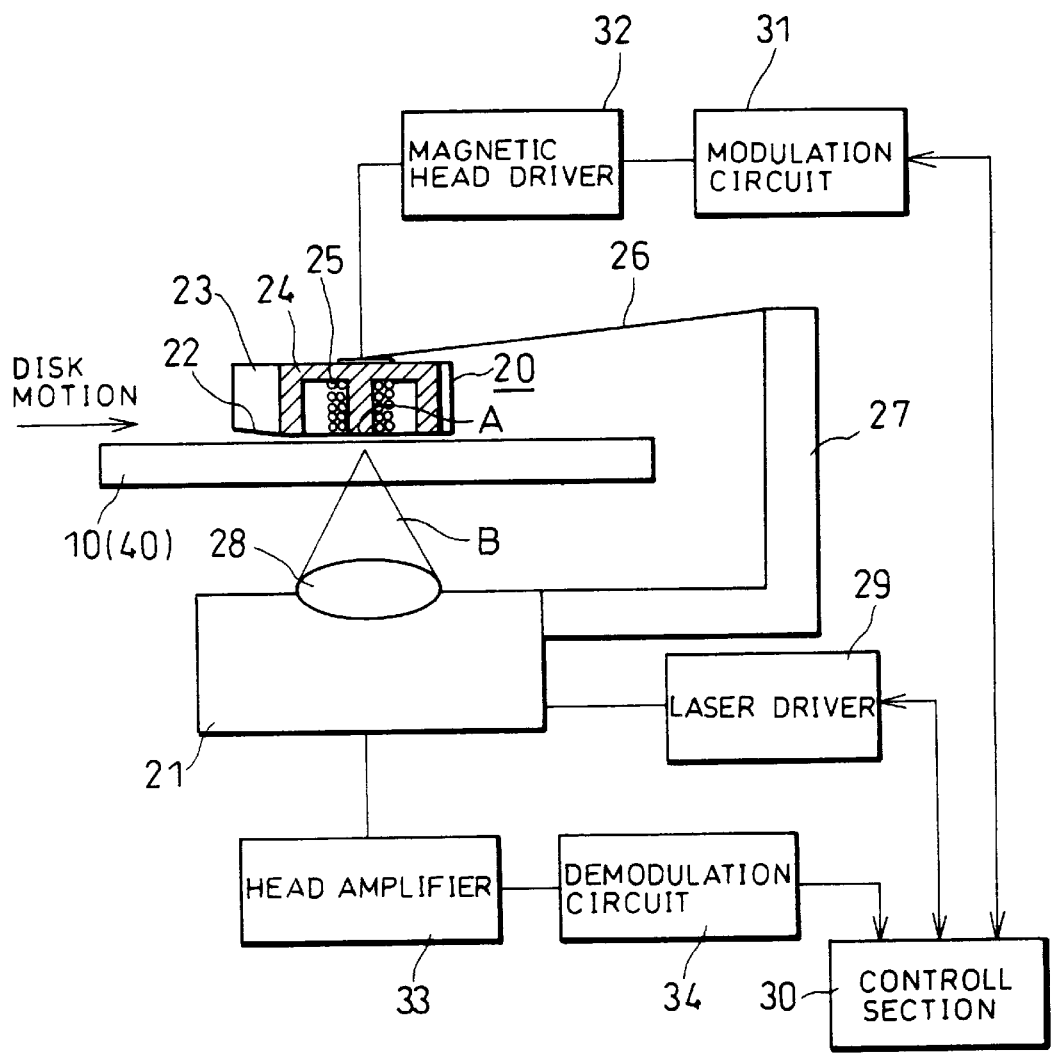
FIG. 2 is a view schematically showing an arrangement of a magneto-optical recording/reproducing apparatus in accordance with an example embodiment of the present invention.

FIG. 2 illustrates a magnetic field modulation recording/reproducing apparatus as a magneto-optical recording apparatus of the present embodiment. The magneto-optical disk 10 of FIG. 1 is set in this apparatus in such a manner that the recording layer 3b faces a magnetic head 20 while the reproducing layer 3a faces an optical pick-up 21, and rotated by an unillustrated spindle motor.

The magnetic head 20 is composed of an E-shaped magnetic core 24 embedded in a floating ceramics slider 23 having a taper 22. A coil 25 wrapped with 25 turns of a 50-$\mu$m-diameter lead wire is attached to the magnetic core 24.

The magnetic head 20 is linked with the optical pick-up 21 by a plate spring 26 and a supporting arm 27. The magnetic head 20 is positioned in such a manner that an area A of the magnetic core 24 is placed directly above the spot of a laser beam B on the magneto-optical disk 10. The laser beam B is emitted from a semiconductor laser (not shown) provided in the optical pick-up 21 to heat the recording layer 3b and reproducing layer 3a, and converged on the magneto-optical disk 10 through an objective lens 28. In the present apparatus, the optical pick-up 21 and objective lens 28 form heating means.

The optical pick-up 21 is arranged to be driven to move along the radius of the magentooptical disk 10 (a direction perpendicular to the plane of FIG. 2) by driving means, such as a linear motor, a stepping motor, and a screw feeder. The magnetic head 20 also moves as the optical pick-up 21 moves while maintaining the described alignment.

When the information is recorded or reproduced, an air flows in a space between the magneto-optical disk 10 and magnetic head 20 from the floating slider 23 at the surface having the taper 22 as the magneto-optical disk 10 rotates, thereby applying lift to the magnetic head 20. Then, the magnetic head 20 is afloat with evenly being spaced apart from the surface of the magentooptical disk 10 with the lift thus applied and the pressing pressure of the plate spring 26 that presses the magnetic head 20 toward the magentooptical disk 10.

In case of the magnetic head 20 of the present apparatus, a linear velocity is 3 m/s and an amount of flotation (a distance between the surface of the magentooptical disk 10 and the surface of the magnetic core 24) is 4–5 $\mu$m when the information is recorded.

The laser driver 29 drives the semiconductor laser of the optical pick-up 21 while its laser power or the like is controlled by a control section 30 composed of a CPU (Central Processing Unit). The control section 30 controls an overall operation of the apparatus including the operation of the optical pick-up 21 and recording/reproducing operations (operations of the laser driver 29, a modulation circuit 31, and a demodulation circuit 34).

The modulation circuit 31 generates a modulation signal in response to recording information, and the magnetic head driver 32 drives the magnetic head 20 by passing a current through the coil 25 in the magnetic head 20 based on the modulation signal.

The head amplifier 33 amplifies the modulation signal from the optical disk 10, and the demodulation circuit 34 reproduces the information based on the modulation signal.

In the present apparatus, the laser driver 29, control section 30, modulation circuit 31, magnetic head driver 32 form recording means. Also, the optical pick-up 21, objective lens 28, head amplifier 33, and demodulation circuit 34 form reproducing means.

In the above apparatus, information is recorded in the magentooptical disk 10 in the following manner. That is, DC (Direct Current) light or pulse light emitted from the semiconductor laser of the optical pick-up 21 is converged on the magentooptical disk 10 through the objective lens 28 to heat the magentooptical disk 10 locally, so that a temperature of the recording layer 3b is raised near the Curie point. While at the same time, a modulation signal in response to the record information is generated from the modulation circuit 31, and the coil 25 in the magnetic head 20 is driven by the magnetic head driver 32 based on the modulation signal, whereby a modulation magnetic field whose polarity is reversed is applied to the recording layer 3b from the area A of the magnetic head 20, whereupon the information is recorded in the magneto-optical disk 10. A size of an information recording area on the magneto-optical disk 10 is determined by a relative relation of the linear velocity of the magentooptical disk 10 versus the modulation frequency of the magnetic head 20. Thus, when the linear velocity and modulation frequency are selected adequately, the information recording area on the magneto-optical disk 10 can be made smaller than a spot of irradiated light from the semiconductor laser of the optical pick-up 21.

The information is reproduced from the magneto-optical disk 10 in the following manner. That is, power of the semiconductor laser of the optical pick-up 21 is reduced from the level used when recording the information, and DC light or pulse light emitted from the semiconductor laser of the optical pick-up 21 is converged through the objective lens 28 to heat the reproducing layer 3a. When the reproducing layer 3a is heated to 100–150° C., its magnetization direction changes from the in-plane magnetization direction to a direction perpendicular to the reproducing layer 3a in response to the magnetization direction of the recording layer 3b. Here, the in-plane magnetization is maintained in an area (portion) of the reproducing layer 3a where the temperature is 100° C. or below. Therefore, the recorded information in such an area is not reproduced. Thus, a polarized component of reflected light from a short bit smaller than a spot of the light beam from the semiconductor laser of the optical pick-up 21 is received by an unillustrated photo-detecting element in the optical pick-up 21. Then, the polarized component is amplified by the head amplifier 33 and reproduced by the modulation circuit 34.

Incidentally, a distribution of perpendicular magnetic field intensity generated from the magnetic heads 20 of various specifications, that is, having different lengths both in the vertical direction (along radius of the magneto-optical disk 10) and the horizontal direction (along the motion of the magentooptical disk 10) of the area A on the magnetic core 24, are measured. Then, it turns out that the perpenduclar magnetic field intensity generated by the magnetic head 20 depends on the length and width of the area A on the magnetic core 24. In other words, to achieve the most effective perpendicular magnetic field intensity when recording the information, it is best to use a sectional area along a plane parallel to the surface of the magneto-optical disk 10 on the magnetic core 24 (hereinafter, referred to as magnetic core sectional area), which is as large as the area A on the magnetic core 24.

The present invention is achieved when it is discovered that the sensitivity of the magneto-optical disk (MSR medium) 10 to the recording magnetic field varies with the magnetic core sectional area on the magnetic head 20 used for the magnetic field modulation recording, and that the sensitivity of the magneto-optical disk (MSR medium) 10 can be improved by setting the magnetic core sectional area of the magnetic head 20 above a predetermined size.

Figure 3:
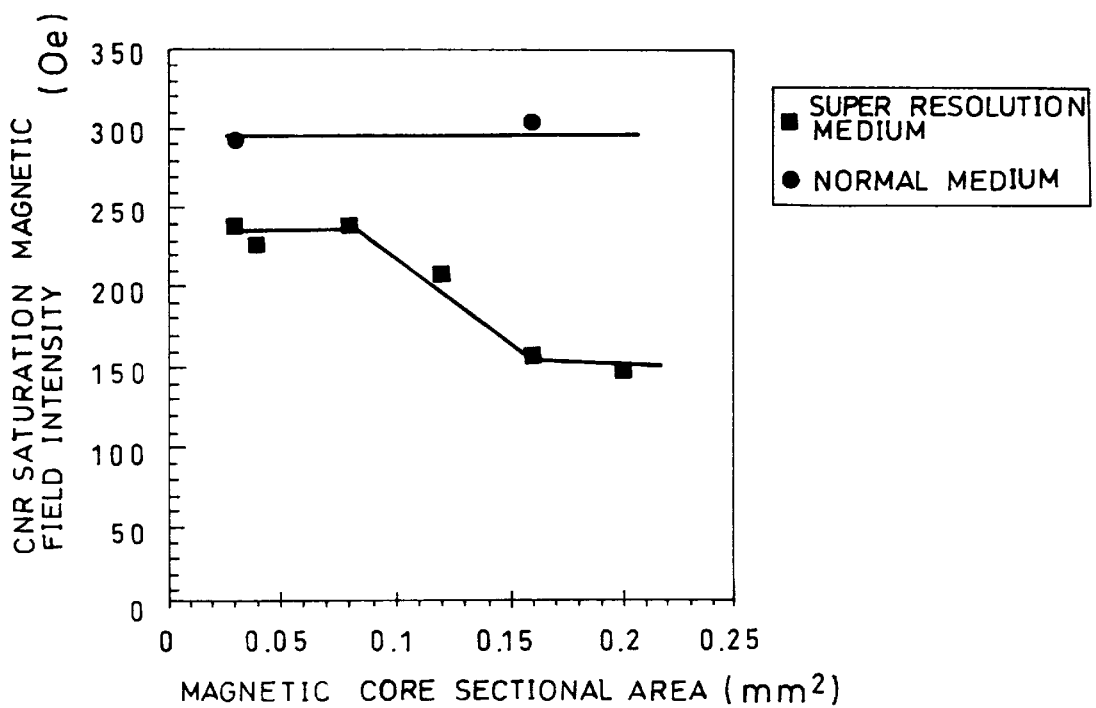
FIG. 3 is a graph showing a relation of a magnetic core sectional area of a magnetic head versus a CNR (Carrier to Noise Ratio) saturation magnetic field intensity.

In FIG. 3, a relation of CNR (Carrier-to-Noise Ratio) saturation magnetic field intensity versus the magnetic core sectional area on the magnetic head 20 in the magneto-optical disk (MSR medium) 10 and the relation in a normal magneto-optical recording medium are represented by black squares and black circles, respectively. Here, the shortest bit of the magentooptical disk 10 is set to 0.93 $\mu$m.

The normal magneto-optical recording medium is a quadrilayer magneto-optical recording medium composed of a substrate, over which a dielectric layer made of aluminum nitride (AlN), an MO (Magneto-optical) layer made of TbFeCo or GdTbFe, another dielectric layer made of aluminum nitride (AlN), and a reflection film layer made of aluminum (Al) are sequentially layered vertically in this order.

FIG. 3 reveals that the magneto-optical disk (MSR medium) 10 maintains the CNR saturation magnetic field intensity of 240 Oe when the magnetic core sectional area is 0.08 mm$^2$ or smaller, and the CNR saturation magnetic field intensity starts to drop from 240 Oe when the magnetic core sectional area on the magnetic head 20 becomes larger than 0.08 mm$^2$. In other words, in the magneto-optical disk (MSR medium) 10, if the magnetic core sectional area on the magnetic head 20 is larger than 0.08 mm$^2$, the CNR saturates even when the recording magnetic field is smaller (smaller than 240 Oe).

FIG. 3 also reveals that, in the magneto-optical disk (MSR medium) 10, the CNR saturation magnetic field intensity is substantially stabilized at 150 Oe when the magnetic core sectional area on the magnetic head 20 is 0.16 mm$^2$ or larger. Thus, it is preferable that the magnetic core sectional area on the magnetic head 20 is 0.16 mm$^2$ or larger.

On the other hand, in the ordinary magneto-optical recording medium, the CNR saturation magnetic field intensity is substantially stabilized at 300 Oe. In other words, the effect of the magnetic core sectional area on the magnetic head 20 on the sensitivity to the recording magnetic field is not observed in the normal magneto-optical recording medium, and it is observed in the magneto-optical disk (MSR medium) 10 alone.

Thus, in the MSR medium (magneto-optical disk) 10, the magnetic core sectional area on the magnetic head 20 affects the sensitivity to the recording magnetic field. For this reason, if the magnetic core sectional area on the magnetic head 20 is set above a predetermine value, the magnetic field intensity necessary to record the information can be reduced. Consequently, an amount of current passing through the coil 25 of the magnetic head 20 can be reduced, and the power consumption and heat generation of the same can be suppressed as well. In addition, the maximum recording frequency can be raised further.

Figure 4:
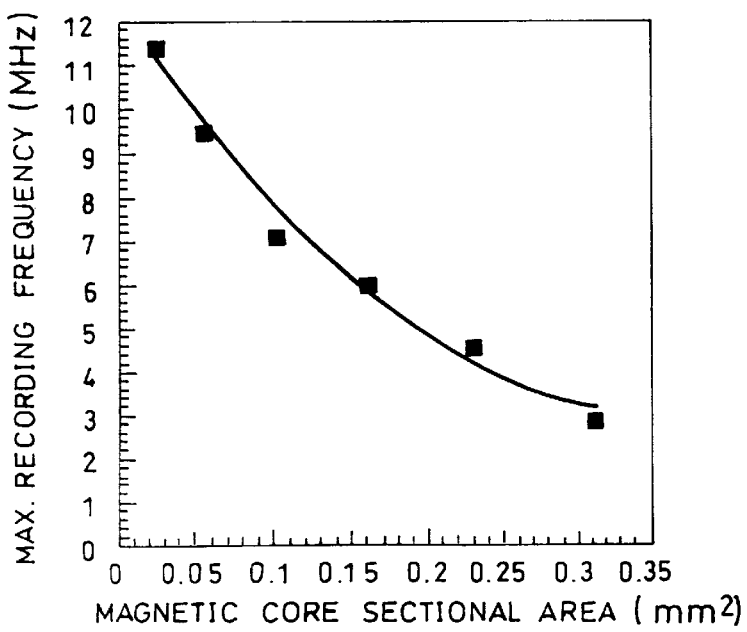
FIG. 4 is a graph showing a relation of a magnetic core sectional area of a 25-turn magnetic head versus a maximum recording frequency (recordable frequency) of the magneto-optical disk.

FIG. 4 illustrates an example relation of the magnetic core sectional area on the 25-turn magnetic head 20 versus the maximum recording frequency (recordable frequency). Here, the perpendicular magnetic field intensity and magnetic field reversing rate are set to 200 Oe and 40 ns, respectively.

It is understood from FIG. 4 that, given the maximum recording frequency of 5 MHz, then the information can not be recorded unless the magnetic core sectional area on the magnetic head 20 is 0.19 mm$^2$ or smaller. The inductance of the magnetic head 20 at this point is 3 $\mu$H or smaller.

Here, the number of turns of the coil 25 is fixed, and the inductance and magnetic core sectional area on the magnetic head 20 are proportional to each other. In other words, in the magnetic head 20, if the inductance is 3 $\mu$H when the magnetic core sectional area is 0.19 mm$^2$, then the inductance is 4.7 $\mu$H when the magnetic core sectional area is 0.3 mm$^2$. Thus, a relation illustrated in FIG. 4 is a relation of the magnetic core sectional area versus a maximum recording frequency, but a relation of the inductance versus a recording frequency is simlar to the one illustrated in FIG. 4.

The magnetic core 24 must have a cross section large enough to cover a necessary magnetic field area with a margin for the moving range of a laser beam on the optical pick-up 21 and mechanical installation errors, etc. In addition, the magnetic core 24 must have inductance which allows the magnetic head driver 32 to secure a recording frequency and maintain the generated magnetic field intensity. In other words, when the magnetic core sectional area on the magnetic head 20 is too large, the inductance rises, which causes heat generation, decrease of the magnetic field reversing rate, and deterioration of the generated magnetic field intensity.

The upper limit of the magnetic core sectional area on the magnetic head 20 varies with the maximum recording frequency, driving ability of the magnetic head driver 32, sensitivity of the magneto-optical disk (MSR medium) 10 to the recording magnetic field, the shape of the magnetic core 24, etc. Thus, the magnetic core sectional area on the magnetic head 20 has no specific upper limit, but it is preferably 2 mm$^2$ or smaller, and more preferably 1 mm$^2$ or smaller.

The magneto-optical recording apparatus of the present embodiment is an apparatus for recording/reproducing the information. However, the magneto-optical recording apparatus of the present invention can be an apparatus for only recording the information.

Embodiment 2

Figure 5:
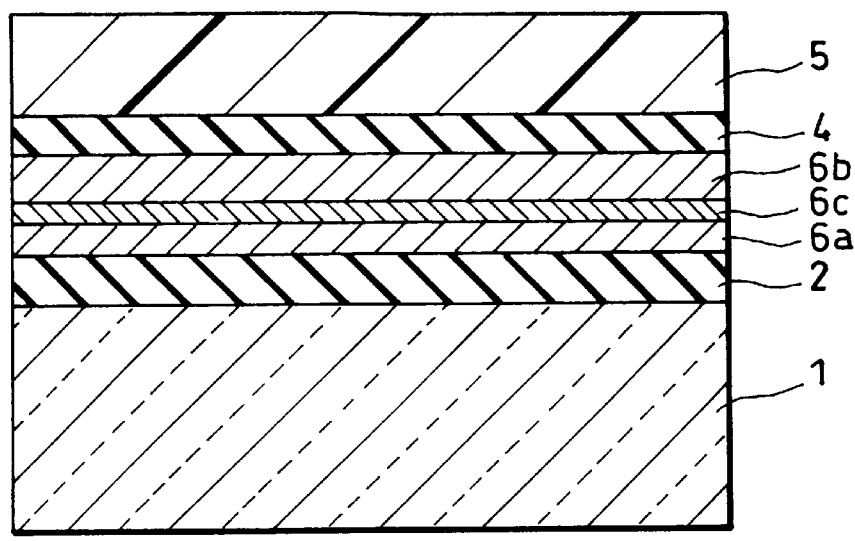
FIG. 5 is a cross section showing a magneto-optical disk in accordance with another example embodiment of the present invention.
Figure 6:
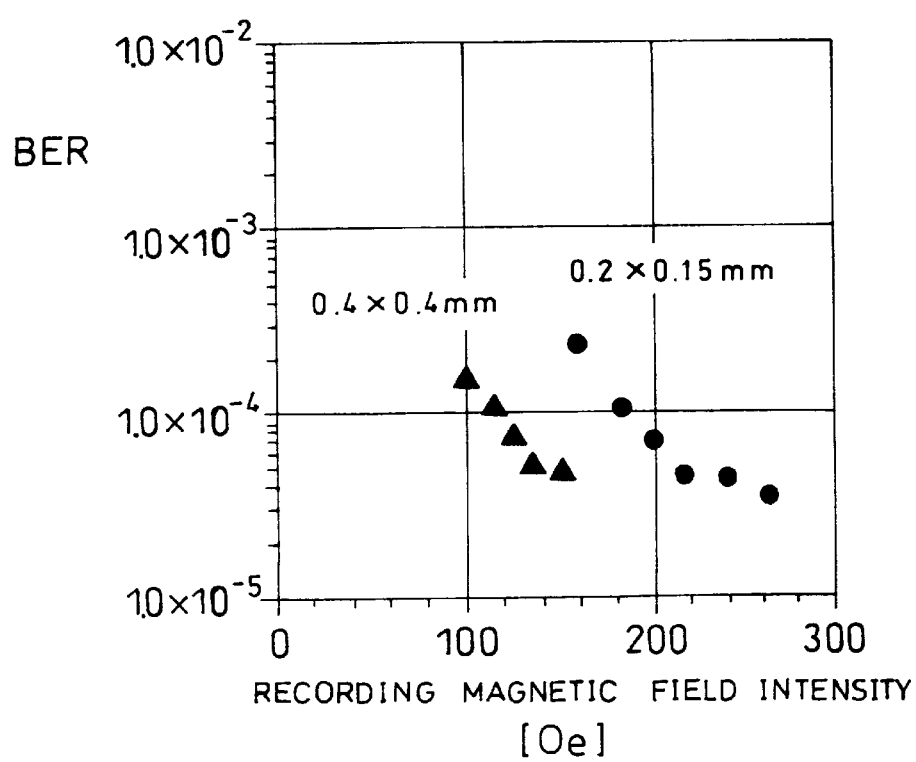
FIG. 6 is a graph showing a relation of a magnetic core sectional area of the magnetic head versus BER (Bit Error Rate) of the magneto-optical disk.

Referring to FIGS. 2, 5, and 6, the following description will describe another example embodiment of the present invention.

A magnetic field modulation recording/reproducing apparatus of Figure 2 as an example magneto-optical recording apparatus of the present embodiment is arranged to record and reproduce information from a magneto-optical disk 40 instead of the magentootpical disk 10.

In other words, in the above apparatus, the optical pick-up 21 and magnetic head 20 oppose each other having the magneto-optical disk 40 inbetween. Under these conditions, DC light or pulse light is irradiated to the magneto-optical disk 40 from the optical pick-up 21, so that a temperature of the magneto-optical disk 40 is raised while the modulated magnetic field is applied to the magneto-optical disk 40 from the magnetic head 20, whereupon the information is recorded.

When the information is recorded or reproduced, air flows in a space between the magneto-optical disk 40 and magnetic head 20 from the floating slider 23 at the surface having the taper 22 as the magneto-optical disk 40 rotates, thereby applying lift to the magnetic head 20. Then, the magnetic head 20 is afloat while evenly being spaced apart from the surface of the magentooptical disk 40 with the flotation thus applied and the pressing pressure of the plate spring 26 that presses the magnetic head 20 toward the magentooptical disk 40.

The magneto-optical disk 40 is a triple-layer MSR medium including a non-magnetic layer. FIG. 5 shows an arrangement of the magneto-optical disk 40. The magneto-optical disk 40 is composed of a transparent substrate 1, over which a 80 nm-thick dielectric layer 2 made of aluminum nitride (AlN), a 125 nm-thick super resolution recording/reproducing layer 6, a 20 nm-thick dielectric layer 9 made of aluminum nitride (AlN), and a 10 μm-thick protection layer 5 are layered sequentially in a vertical direction.

The super resolution recording/reproducing layer 6 is composed of a double-layer reproducing layer 6a including a 40 nm-thick GdFeCo layer and a 20 nm-thick GdFe layer, a 5 nm-thick intermediate layer 6b made of aluminum nitride (AlN), and a recording layer 6c including a 40 nm-thick TbFeCo layer and a 20 nm-thick GdFeCo layer.

The magneto-optical material (GdFeCo) used in the reproducing layer 6a has a magnetization direction parallel to the reproducing layer 6a at room temperature, and the magnetization direction changes to a perpendicular direction to the reproducing layer 6a when a temperature of the magneto-optical disk 40 is raised with irradiation of a laser beam. Different from the super resolution recording/reproducing layer 3 of Embodiment 1, the super resolution recording/reproducing layer 6 has a structure, in which the intermediate layer 6b made of a dielectric (aluminum nitride) film is placed between the reproducing layer 6a and recording layer 6c. Thus, the magnetic direction of the reproducing layer 6a is not changed by magnetic exchange interaction between the layers but by the magnetostatic force. Therefore, the magentooptical disk 40 is identical with the magneto-optical disk 10 of Embodiment 1 in that it is an MSR medium, but it is different in the structural arrangement and the principle of how the MSR is generated.

In other words, the magneto-optical disk 10 of Embodiment 1 is an MSR medium that transfers a record bit to the reproducing layer 3a by the magnetically induced interaction (exchange interaction) between the reproducing layer 3a and recording layer 3b. On the contrary, the magneto-optical disk 40 is an MSR medium which transfers a recorded bit to reproducing layer 6a by the magnetostatic force from the recording layer 6c.

Each of the reproducing layer 6a and recording layer 6c may be composed of a single layer or more than two different layers. Further, a film thickness and materials of the intermediate layer 6b are not especially limited as long as it is made of a dielectric film.

The magnetic head 20 is composed of an E-shaped magnetic core 24 embedded in a floating ceramics slider 23. A coil 25 which is wrapped with 25 turns of 50-μm-diameter lead wires is attached to the magnetic core 24.

The magnetic head 20 is linked with the optical pick-up 21 by a plate spring 26 and a supporting arm 27. The magnetic head 20 is positioned in such a manner that the center of the magnetic core 24 is placed directly above the spot (irradiation point on the magneto-optical disk 40) of a laser beam B emitted from the semiconductor laser provided in the optical pick-up 21 when the information is recorded.

In case of the magnetic head 20 of the present apparatus, a linear velocity is 3 m/s and an amount of flotation (a distance between the surface of the magentooptical disk 40 and the surface of the magnetic core 24) is 4–5 μm when the information is recorded.

The optical pick-up 21 is arranged to be driven to move along the radius of the magneto-optical disk 40 (a direction perpendicular to the plane surface of FIG. 2) by driving means, such as a linear motor.

Then, a recording/reproducing experiment is carried out using two types of magnetic heads 20 having different magnetic core sectional area. Here, of all the types of the magnetic heads 20 used in the recording/reproducing experiment in Embodiment 1, a magnetic head 20 whose sectional area of the magnetic core 24 (a cross section parallel to the surface of the magneto-optical disk 40) is 0.2×0.15 mm, and another magnetic head 20 whose sectional area of the magnetic core 24 is of 0.4×0.4 mm are selected.

These magnetic heads 20 have different inductance because of the difference in magnetic core sectional areas. More specifically, the inductance of the magnetic head 20 whose magnetic core 24 has the cross section of 0.2×0.15 mm is 0.8 μH, and the inductance of the other magnetic head 20 whose magnetic core 24 has the cross section of 0.4×0.4 mm is 3.0 μH. For this reason, the reversing time of the driving current of each magnetic head 20 is adjusted to be the same by setting a different constant to the driving circuit in the magnetic head driver 32.

FIG. 6 illustrates a result of a recording/reproducing experiment to examine a relation of an error rate versus perpenduclar magnetic field intensity when the information is recorded in the magneto-optical disk 40 by the magnetic field modulation. Here, the information is recorded using a (1, 7) RLL (Run Length Limited) random signal, and a shortest bit length recorded in the magneto-optical disk 40 is 0.25 μm. In the drawing, black triangles indicate the result from the magnetic head 20 whose magnetic core 24 has the cross section of 0.4×0.4 mm, and black circles indicate the result from the magnetic head 20 whose magnetic core 24 has the cross section of 0.2×0.15 mm.

A recording magnetic field to achieve a minimum error rate is 220 Oe in case of the magnetic head 20 whose magnetic core 24 has the cross section of 0.2×0.15 mm and 140 Oe in case of the magnetic head 20 whose magnetic core 24 has the cross section of 0.4×0.04 mm, leaving a balance of 80 Oe. FIG. 6 reveals that, like in Embodiment 1 above, when the magnetic core sectional area of the magnetic head 20 is larger, the error rate can be minimized with a smaller recording magnetic field.

A phenomenon that the sensitivity to the recording magnetic field varies with the magnetic core sectional area of the magnetic head 20 is not observed in the normal single-layer magentooptical recording medium, but in the MSR medium (magentooptical disk 40) alone. Thus, it can be said that this is a unique phenomenon to the MSR medium.

Also, it is understood that the effect of the present application does not depend on the principle of how the MSR is generated, because the same effects are achieved in two types of the MSR media (magneto-optical disks 10 and 40) each having their respective principles of how the MSR is generated.

Thus, in the MSR medium (optical recording disk 40), the magnetic core sectional area serving as the effective magnetic field area of the magnetic head 20 affects the sensitivity to the recording magnetic field, and if the magnetic core sectional area is set to a value larger than a predetermined value, the magnetic intensity necessary to record the information can be reduced. Accordingly, an amount of current passing through the coil 25 can be reduced, while the power consumption and heat generation by the magnetic head 20 can be reduced. Also, the maximum recording frequency can be raised further.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording apparatus for recording information in a magnetically induced super resolution medium having a magneto-optical recording and reproducing layer, comprising:

a magnetic head, heating means for heating the recording layer of said magnetically induced super resolution medium, and recording means for recording the information in the recording layer of said magnetically induced super resolution medium by driving said magnetic head and heating the recording layer using said heating means, wherein said heating means includes an optical pick-up for emitting a laser beam on said magnetically induced super resolution medium, said magneto-optical recording and reproducing layer is constituted by a plurality of magnetic layers including a recording layer and a reproducing layer stacked on an optical pick-up side of the recording layer, the reproducing layer exerts in-plane magnetization at room temperature and vertical magnetization at a time when a laser beam for reproduction is emitted so as to heat the reproducing layer, and said magnetic head has a magnetic core whose sectional area along a plane parallel to a surface of said magnetically induced super resolution medium is larger than 0.08 mm$^2$.

2. The magneto-optical recording apparatus of claim 1, wherein said recording means records the information by a magnetic field modulation method.

3. The magneto-optical recording apparatus of claim 1, wherein the sectional area of said magnetic core along the plane parallel to the surface of said magnetically induced super resolution medium is 0.16 mm$^2$ or larger.

4. The magneto-optical recording apparatus of claim 1, wherein the sectional area of said magnetic core along the plane parallel to the surface of said magnetically induced super resolution medium is 2 mm$^2$ or smaller.

5. The magneto-optical recording apparatus of claim 1 further comprising reproducing means for producing the perpendicular magnetization in said reproducing layer by irradiating the laser beams onto said magnetically induced super resolution medium.

* * * * *